United States Patent

Baldy et al.

Patent Number: 5,297,361
Date of Patent: Mar. 29, 1994

[54] POLISHING MACHINE WITH AN IMPROVED SAMPLE HOLDING TABLE

[75] Inventors: André Baldy, Seyssins; Gérard Barrois, Le Fontanil; Henri Blanc, Saint Julien de Ratz; Marcel Dominiak, Grenoble, all of France

[73] Assignee: Commissariat a l'Energie Atomique, Paris, France

[21] Appl. No.: 92,565

[22] Filed: Jul. 16, 1993

Related U.S. Application Data

[63] Continuation of Ser. No. 893,052, Jun. 3, 1992, abandoned.

[30] Foreign Application Priority Data

Jun. 6, 1991 [FR] France ................. 91 06868

[51] Int. Cl.$^5$ .................. B24B 7/07; B24B 41/06
[52] U.S. Cl. ..................... 51/119; 51/216 A; 51/240 A
[58] Field of Search ..................... 51/216 LP

[56] References Cited

U.S. PATENT DOCUMENTS

| | | | |
|---|---|---|---|
| 2,195,065 | 3/1940 | Wallace | 51/119 |
| 2,272,974 | 2/1942 | Indge | 51/120 |
| 2,383,131 | 8/1945 | Krisch | 51/283 R |
| 2,539,561 | 1/1951 | Wolfskill | . |
| 3,130,523 | 4/1964 | Monnet | 51/119 |
| 3,364,625 | 1/1968 | Sogge | 51/119 |
| 4,063,462 | 12/1977 | Himmler | . |
| 5,105,583 | 4/1992 | Hammond et al. | 51/119 |

FOREIGN PATENT DOCUMENTS

| | | |
|---|---|---|
| 8915458 | 1/1991 | Fed. Rep. of Germany . |
| 96278 | 6/1972 | France . |
| 5481 | 8/1896 | Norway ................. 51/120 |

Primary Examiner—Bruce M. Kisliuk
Assistant Examiner—Bryan S. Reichenbach
Attorney, Agent, or Firm—Oblon, Spivak, McClelland, Maier & Neustadt

[57] ABSTRACT

Polishing machine with an improved sample holding table in which the table has a cardan system with two first shafts having a first common longitudinal axis and two second shafts having a second common longitudinal axis. The shaft axes being in a polishing plane and intersecting in the center of the sample face to be polished. The machine can be applied to the production of magnetic read-write heads.

3 Claims, 4 Drawing Sheets

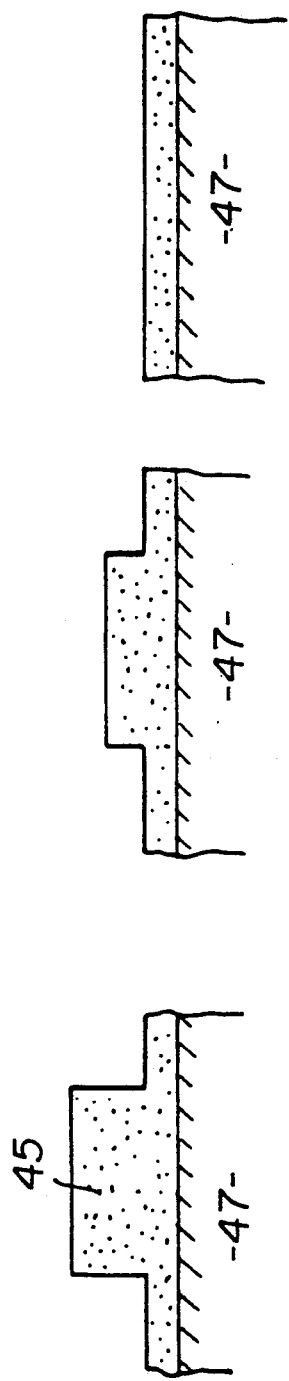
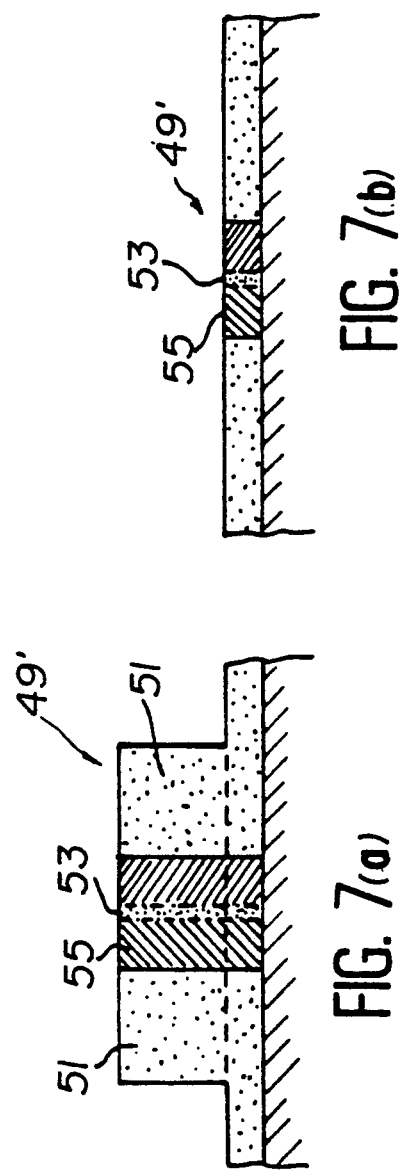

POLISHING MACHINE WITH AN IMPROVED SAMPLE HOLDING TABLE

This application is a continuation of application Ser. No. 07/893,052, filed on Jun. 3, 1992, now abandoned.

DESCRIPTION

The present invention relates to a polishing machine with an improved sample holding or carrying table.

The invention more particularly applies to the polishing of integrated microelectronic components in semiconductor wafers (e.g. of silicon). They can e.g. be magnetic read-write heads.

Processes for producing such heads are described in numerous documents and in particular in U.S. Pat. No. 4,837,924 and U.S. Pat. No. 4,333,229. The first document relates to horizontal structure heads, being formed from a stack of layers deposited on the upper face of a semiconductor wafer, while the second document relates to vertical structure heads, being formed from layers deposited on the edge of such a wafer.

The micromachining operations performed on such wafers consist in the first case of levelling or planarizing and polishing various intermediate subassemblies obtained during the production process, defining a head gap and bringing the complete head into the general plane of the substrate also known as the movement plane. In the second case, the micromachining operations aim at defining a head gap and at adjusting the shape of the movement shoes.

Although it could possibly apply to the construction of heads of the second category (vertical heads), the machine according to the invention is more particularly intended for the polishing of assemblies or subassemblies corresponding to the first category (horizontal heads), because it is in this case that the technical problems are the most difficult.

FIG. 1 shows as an example of a part to be polished, a horizontal structure magnetic read-write head. The assembly shown corresponds to the final stage of production prior to the final polishing. The assembly comprises a silicon substrate 10 in which has been etched a recess, an iron-nickel alloy magnetic circuit 12, a double copper coil 14, a 3 to 6 $\mu$m thick silica layer 16, an approximately 1 $\mu$m thick amagnetic silica spacer 18 and two iron-nickel upper pole pieces. The plane of the final polishing is indicated in dotted line form and designated 22.

The removal of the material relates to the pole pieces and the extensions 23 made from silica. In order not to deteriorate the magnetic circuit, the removal must not reduce the thickness of the uniform silica layer by more than 0.3 $\mu$m. The final polishing plane defines the movement plane of the head.

Two such heads are generally juxtaposed on parallel strips known as skis defining two movement planes in a generally catamaran-like structure.

The polishing operation, which consists of the removal of a very small material quantity is well known. It is encountered in metallography, optics and microelectronics.

It is possible to use one or other of the two following procedures. The first consists of grinding with a diamond tool, where machining leads to a continuous or semicontinuous "shaving" by two relative combined movements between the tool and the part to be machined (an advance movement and a cutting movement). The second procedure consists of grinding and polishing constituting a varingly fine abrasion or cold-working of a controlled nature of the surface by rubbing on very varied disks which are not abrasive by nature and to which an abrasive in paste or aqueous solution form has been applied. A variant consists of placing on a rotary polishing disk, an abrasive film disk and spraying the latter during polishing with a liquid in order to cool the part and prevent dirtying.

The polishing of semiconductor wafers having a very large number of integrated microcomponents causes various problems. Firstly the wafer is deformed and deformable. The grinding operation must also affect simultaneously several materials of very different hardnesses such as silica, alumina, alumina/titanium carbide alloy and iron/nickel alloy. The parts to be ground have very small surfaces compared with the silicon wafer. Finally, it is a question of machining in their thickness layers deposited on a wafer and in general it is necessary to simultaneously polish 600 excrescences corresponding to 600 magnetic heads, which project by a few microns and this is necessary with an accuracy of approximately 1 nanometer, without reducing the thickness of the film covering the wafer by more than 200 to 300 nm.

The known polishing machines do not make it possible to satisfy all these requirements. Thus, their general design is such that an unwanted torque is introduced into the force exerted on the sample to be polished and which is prejudicial to the uniformity of the pressure applied during the polishing operation and leads to excessive action on the sample edges.

FIGS. 2 and 3 provide a better understanding of the origin of this sample effect.

FIG. 2 shows a known machine comprising a polishing disk 30, a head 32 able to support a sample 44 and means 34 for exerting a force F on the support head in order to apply the sample 44 to the polishing disk 30 and for displacing them transversely with respect to one another. The polishing disk 30 performs a rotary movement and is located at the base of the machine.

FIG. 3 shows in greater detail the support head 32 with a rigid part 40' for holding the sample wafer 44. The rigid part 40' is equipped in its upper portion with a self-aligning or ball bearing 58 in which bears a shaft 60. The disk 30 performs a cutting movement symbolized by the arrow MC (generally this is a circular translation movement which is a circular movement which maintains the orientation of the sample unchanged). As the ball 58 is located within the material of the sample support head, the application point of the cutting force is displaced by a value d relative to the polishing plane. This value is small, but never zero.

During the movement of the sample holder, the cutting force $F_c$, combined with the displacement, leads to a supplementary force T at a point of the plate at a distance r from the center. This force is directed perpendicular to the sample and is proportional to the ratio $d/v$ (with $v \neq 0$).

The present invention aims at obviating this disadvantage. To this end it proposes a polishing machine, whose sample support is improved in such a way that the unwanted torque does not exist. For this purpose the machine according to the invention uses a cardan sample holding table, whose shafts are secant to the center of the plane to be ground (which is equivalent to a zero distance d between the cutting force application point and the polishing plane). The polishing tool is then placed above the sample holding table held in a support head. The cutting force is applied to the head. Therefore the arrangement is the opposite to that generally adopted.

Polishing heads using a cardan system are already known. For example, FR-E-96 278 describes a polishing machine with a tubular element having two notches in which bear two studs of a ring. The ring is fixed to a slider by two screws. By means of a respective clearance between these two parts, the tubular element can oscillate relative to the ring, which can oscillate relative to the slider, in accordance with two shafts forming a cardan system.

In such a system, the sample to be polished, which is located in the lower part of the tubular element, is positioned at a certain distance from the plane of the two rotation shafts. Therefore there is a necessary appearance of an unwanted torque.

BRIEF DESCRIPTION OF THE DRAWINGS

The invention is described in greater detail hereinafter relative to non-limitative embodiments and with reference to the attached drawings, wherein show:

FIGS. 6(a) to 6(c) An example of polishing a silica excrescence.

FIGS. 7(a) to 7(b) Another example of polishing in the case of a pattern of two different materials.

DESCRIPTION OF THE PREFERRED EMBODIMENTS

Figure 4A:
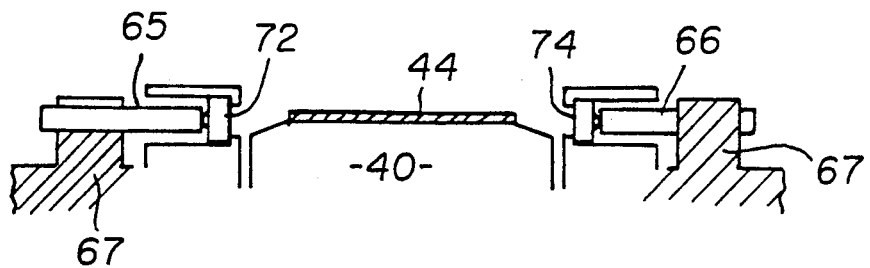
FIGS. 4(a) and 4(b) show an improved sample holding table according to the invention.
Figure 4B:
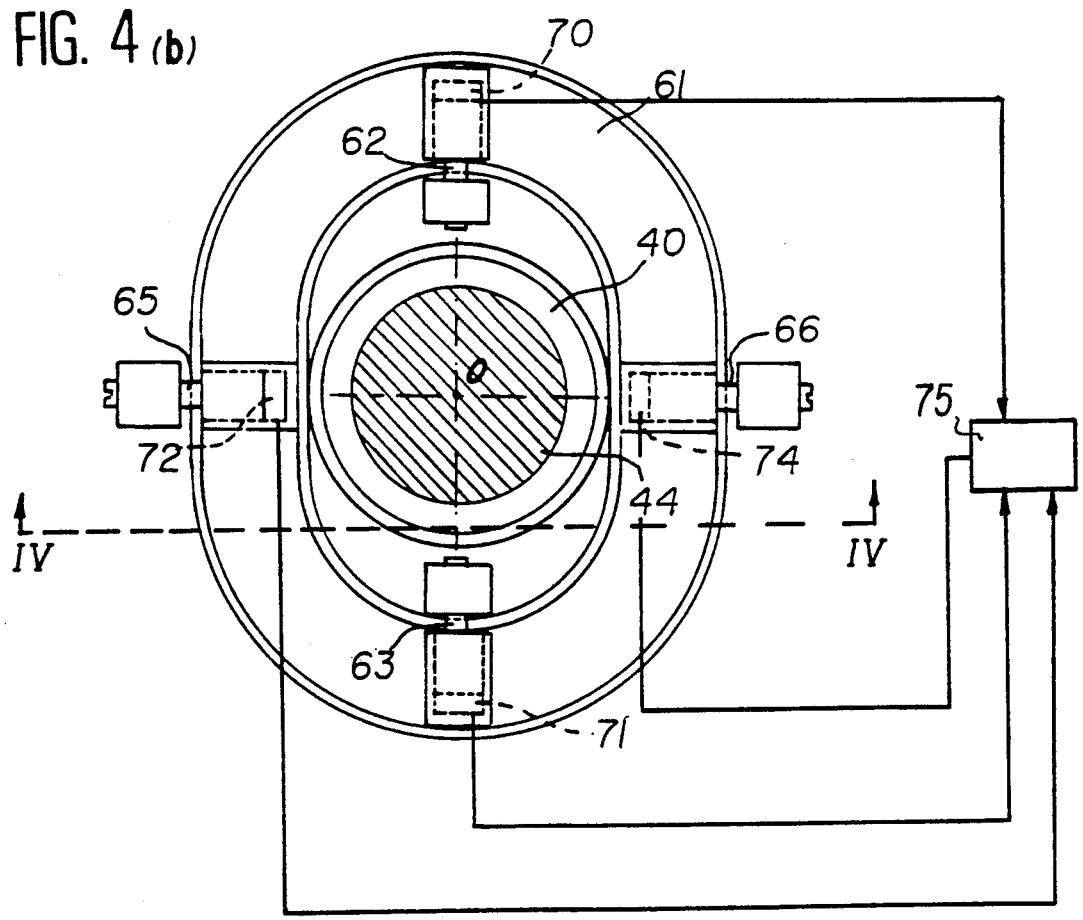

FIG. 4 shows in section (part a) and in plan view (part b) a sample holding table according to the invention. FIG. 4(a) illustrates a section through line IV—IV of FIG. 4(b). This table has a non-deformable, rigid ring 61 connected to a rigid part 40 which supports or holds the sample wafer 44 by two shafts 62, 63 and to the frame 67 of the machine by two other shafts 65, 66. The shafts 62, 63 on the one hand and 65, 66 on the other are perpendicular to one another and intersect at the center O of the wafer 44.

Preferably, cutting force sensors or transducer 70, 71, 72, 73 are located on the shafts. The transducers are connected to means 75 for displaying the average cutting force. For this purpose these means form the rectified, filtered sum of the alternate signals supplied by these four transducers.

Figure 1:
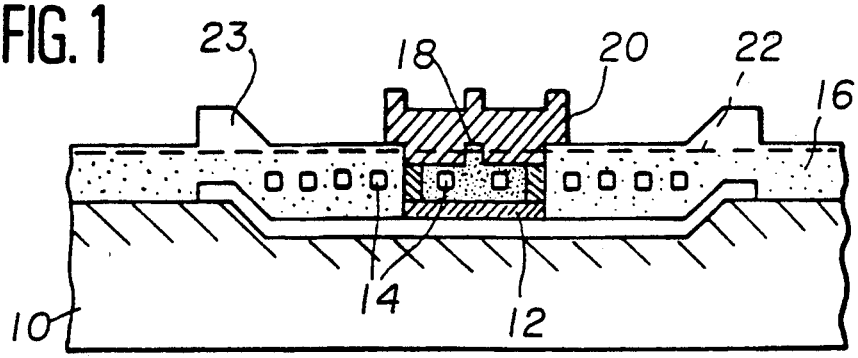
FIG. 1, already described, an example of a part to be polished corresponding to a magnetic read-write head.
Figure 2:
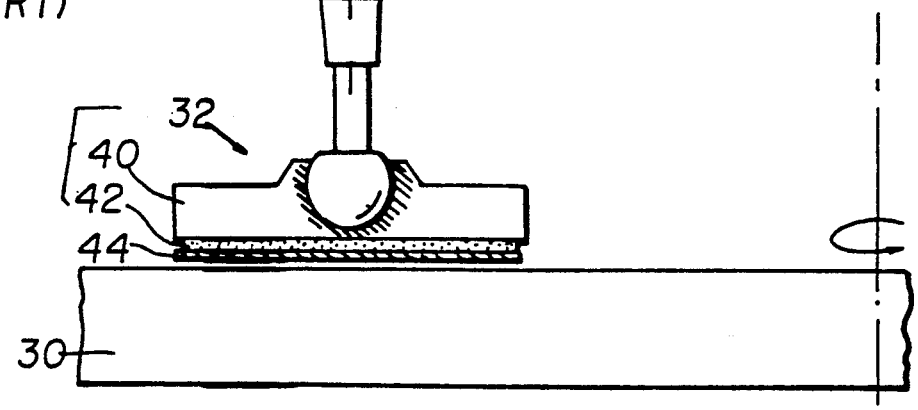
FIG. 2, already described, the general structure of a prior art polishing machine.
Figure 3:
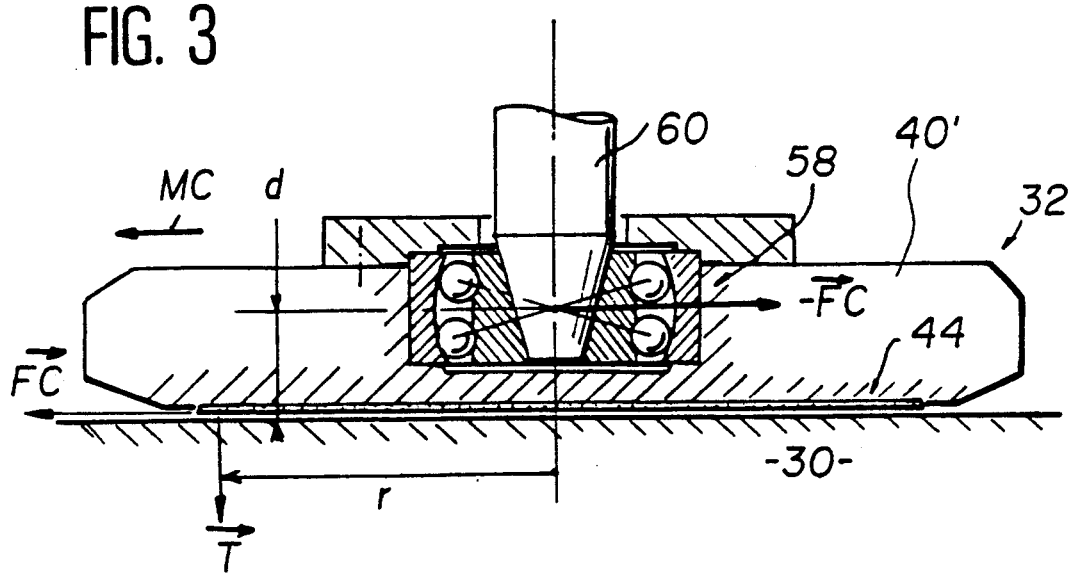
FIG. 3, already described, a ball head support.
Figure 5:
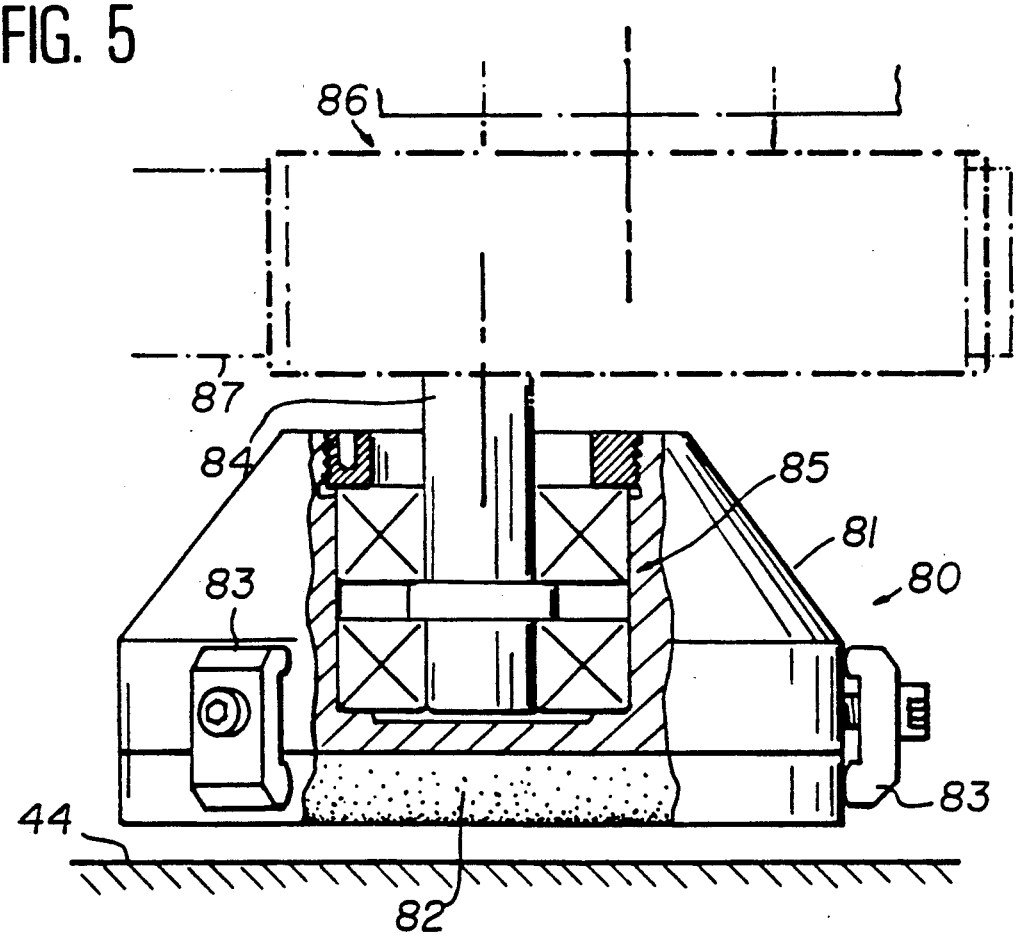
FIG. 5 A polishing head adapted to the aforementioned sample holding table.

FIG. 5 shows an embodiment of the polishing head 80, which comprises a body 81 supporting an abrasive disk 82 fixed by catches 83. Therefore the abrasive disks are interchangeable. A shaft 84 enters the body 81 through a clearance-free pivot 85. The shaft 84 is given a circular translation movement, which is a circular movement in which the sample maintains the same orientation, by an eccentric 86 rotated by a belt 87 connected to a not shown motor.

With the present polishing machine, the Applicant has obtained remarkable results as illustrated in FIGS. 6 and 7.

In FIG. 6 it is possible to see in part a) an approximately 2 $\mu$m high silica relief 45 on a 1 $\mu$m thick silicon layer 47 having a roughness Ra=50 nm. During polishing (part b), the profile maintains its sharp edges. At the end of polishing (part c), the relief has disappeared and the base layer has been brought to a thickness of 0.9 $\mu$m, with a roughness of Ra=1 to 2 nm on the complete treated surface.

FIG. 7 relates to an excrescence using materials of different hardnesses, namely silica $SiO_2$ on either side (reference 51) of the pattern and in a very thin spacer 53 (approximately 1 $\mu$m) and an iron-nickel FeNi alloy 55 on either side of the spacer 53.

It is possible to see in part a) the initial shape of the pattern 49 and in part b) the final shape 49' after polishing. The roughness of the top is approximately Ra=1 to 2 nm. These results were obtained on the complete plate or wafer supporting the patterns and in particular on the edges thereof.

We claim:

1. A polishing machine comprising:
    a holder for maintaining a sample wafer, said sample wafer having a face to be polished, said face having a center and being directed upwards;
    a rigid ring articulated on said holder by two first articulation shafts having a first common longitudinal axis;
    two second articulation shafts on said rigid ring for connecting said rigid ring to a frame, said two second articulation shafts having a second common longitudinal axis perpendicular to said first common longitudinal axis, said first and second common longitudinal axis being in a plane of the face to be polished and intersecting at said center of said face to be polished;
    means for holding an abrasive disk above said holder;
    means for applying said abrasive disk on said sample wafer; and
    means for displacing said abrasive disk with respect to said sample wafer.

2. The polishing machine according to claim 1, further comprising:
    four a transducer on each of said two first and two second articulation shafts; and
    a display means connected to said transducers for displaying an average cutting force.

3. The polishing machine according to claim 1, wherein said means for displacing said abrasive disk with respect to said sample wafer displaces said abrasive disk in a circular translation movement.

* * * * *